United States Patent [19]

Abbes et al.

[11] 4,188,037
[45] Feb. 12, 1980

[54] COMPOSITE FLEXIBLE JOINT

[75] Inventors: Claude Abbes, Saint Etienne; Andre Gournier, Saint Priest en Jarez; Christian Rouaud, Bourg Saint Andeol; Raymond de Villepoix, Donzere, all of France

[73] Assignee: Commissariat a l'Energie Atomique, Paris, France

[21] Appl. No.: 972,009

[22] Filed: Dec. 21, 1978

[30] Foreign Application Priority Data

Jan. 6, 1978 [FR] France .................... 78 00290
May 25, 1978 [FR] France .................... 78 15555

[51] Int. Cl.² ........................................... F16J 15/12
[52] U.S. Cl. ............................. 277/2; 277/164;
           277/180; 277/235 R; 277/236
[58] Field of Search ............ 277/2, 164, 165, 167, 277/180, 182–184, 188 A, 198, 234, 235 R, 235 A, 235 B, 236

[56] References Cited

U.S. PATENT DOCUMENTS

| 2,599,767 | 6/1952 | Long | 277/235 |
| 3,141,685 | 7/1964 | Watts | 277/2 X |
| 3,163,431 | 12/1964 | Tanner | 277/180 X |
| 3,603,602 | 9/1971 | Padula | 277/164 |
| 3,846,608 | 11/1974 | Valles | 277/230 X |
| 3,917,294 | 11/1975 | Abbes et al. | 277/180 |
| 4,026,565 | 5/1977 | Jelinek | 277/235 B X |
| 4,114,907 | 9/1978 | Abbes et al. | 277/236 X |

FOREIGN PATENT DOCUMENTS 190390  7/1964  Sweden .................... 277/2

*Primary Examiner*—Robert S. Ward, Jr.
*Attorney, Agent, or Firm*—Cameron, Kerkam, Sutton, Stowell & Stowell

[57] ABSTRACT

Metalloplastic flexible annular joint, wherein it comprises a first metal ring constituted by an inner metal spring with contiguous turns closed on itself and surrounding said spring, at least one metal envelope in which is embedded the spring, said envelope being extended by two parallel planar faces which extend in a transverse equatorial plane of symmetry of the joint, said faces having flared extensions moving away from said plane at a predetermined distance from the spring to partly surround a second solid elastomer plastic ring which is coaxial to the spring in such a way as to create between the two rings a sealed enclosure of limited volume which can be used for controlling the sealing of the joint.

8 Claims, 6 Drawing Figures

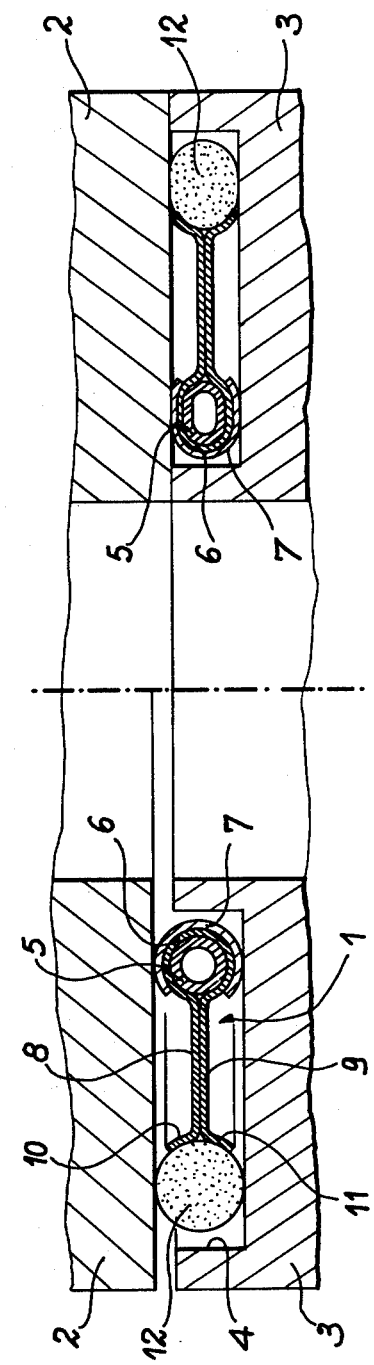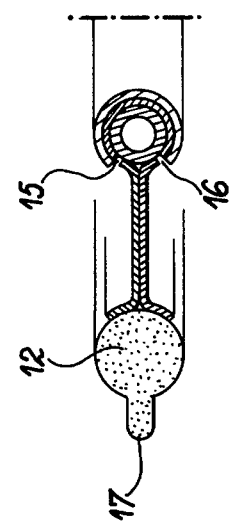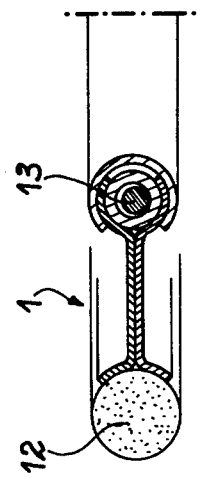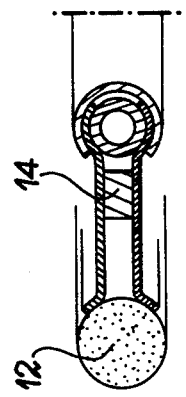
FIG. 1
FIG. 2
FIG. 3
FIG. 4

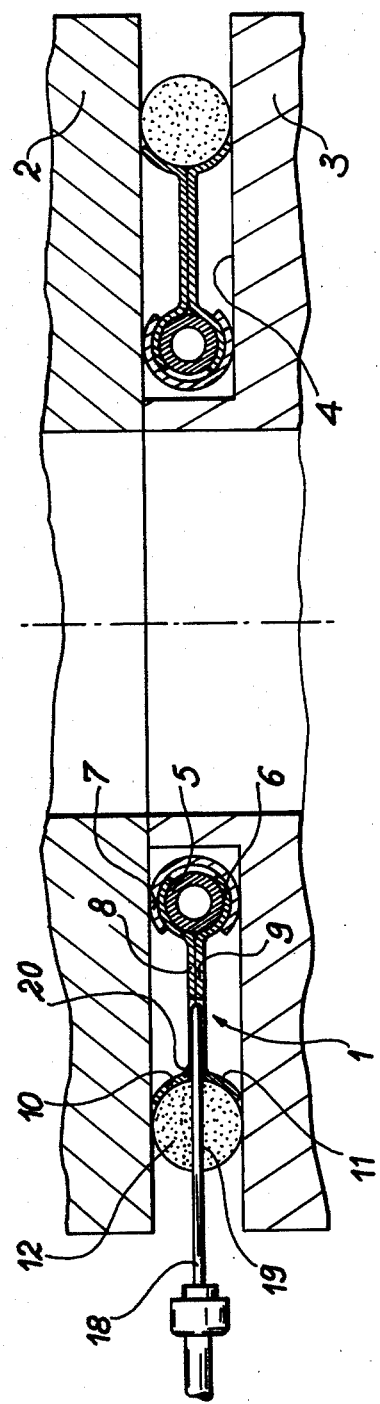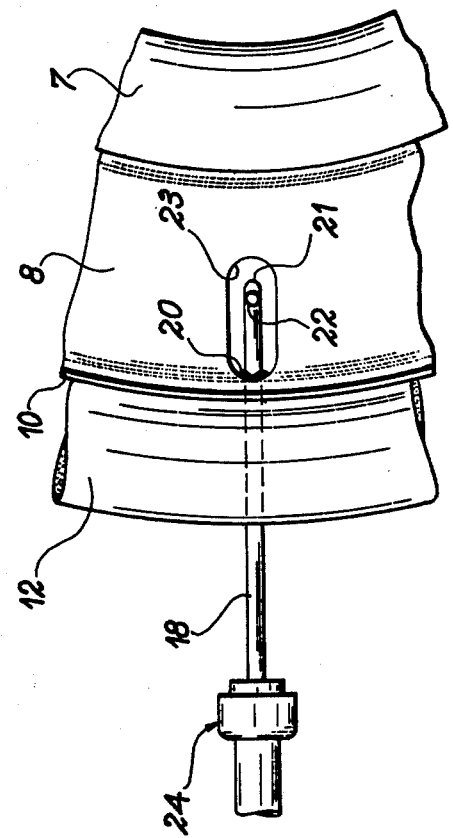

COMPOSITE FLEXIBLE JOINT

BACKGROUND OF THE INVENTION

The present invention relates to a composite flexible joint of the type having more particularly an inner core formed by a helical spring with contiguous turns, closed onto itself, with a circular cross-section and partly surrounding said spring, whereby at least one metal envelope which can be brought into contact with the parallel walls or surfaces effects sealing on either side of the spring by limited compression of the joint.

In a special embodiment of such an annular joint as described and claimed in French Pat. No. 2 151 186 in the name of the Commissariat a l'Energie Atomique the composite joint has two envelopes, the first made from a slightly ductile metal surrounding the spring of the inner core embedded in said envelope, whilst the second which is made from ductile metal partly surrounds the first envelope. These two envelopes have a C-shaped cross-section, whereby the joint can have a random contour, particularly shaped like a torus or having rectilinear sides joined by curvilinear portions. Preferably the spring constituting the inner core of the joint is made from steel, the first envelope from mild steel and the second envelope from aluminium.

According to various improvements to the above annular joints, particularly described and claimed in French Additions 2 224 029 and 2 232 235 to the above Main Patent the second envelope made from ductile metal may have its outer surface coated with a coating of a material with a low friction coefficient, such as polytetrafluoroethylene (Teflon), the inner spring also being associated with a rigid metal locking ring which limits the crushing of the spring. The continuous or discontinuous locking ring is positioned externally or internally of the spring.

BRIEF SUMMARY OF THE INVENTION

The present invention relates to an improvement made to a composite flexible annular joint of the type defined hereinbefore comprising at least one metal envelope surrounding an inner spring, whereby said improvement in particular permits the insulation of the actual joint from the outer ambient medium, whilst giving the possibility of controlling the sealing obtained due to a double metalloplastic structure between the two rings constituting the joint.

To this end the joint, having a double annular profile closed on itself and with a generally toroidal shape is characterised in that the envelope surrounding the inner spring is extended by two parallel planar faces extending in a transverse equatorial plane of symmetry of the joint, said faces having flared extensions moving a predetermined distance from said spring so as to partially surround a solid elastomer ring coaxial to said spring.

The envelope surrounding the inner spring can either be connected directly to the two parallel planar faces or can have discontinuities at the connection to the planar faces.

By permitting a double sealing along two concentric circumferential lines the metalloplastic joint according to the invention provides the possibility of a permanent control of the sealing in the space defined between the solid elastomer ring on the one hand and the metal envelope surrounding the inner spring on the other hand, said space thus constituting a sealing control enclosure.

Thus, according to especially advantageous developments the joint according to the invention can have at least one transverse capillary tube which traverses the elastomer ring and a flared extension on one of the planar faces extending the envelope surrounding the inner spring, said capillary tube issuing into an opening made in said face.

As a result of the provision of such a capillary tube the composite joint according to the invention is directly provided with a detection device permitting the control at all times of the quality of the atmosphere, particularly vacuum, in the space between the ring and the envelope bearing against the walls or surfaces between which is realised the sealing by the joint.

According to a special feature the capillary tube traverses substantially diametrically the elastomer ring by an opening whose diameter is slightly smaller than that of the tube, in order to bring about the sealing of said cross-member. Moreover, the capillary tube is advantageously joined to the flared extension which it traverses by a welding spot.

BRIEF DESCRIPTION OF THE DRAWINGS

Other characteristics of a flexible annular joint according to the invention can be gathered from the following description of preferred, non-limitative embodiments and with reference to the attached drawings, wherein show:

FIG. 1 is a diagrammatic cross-sectional view of an annular joint according to the invention fitted into a groove between two bearing surfaces between which it provides the sealing, said joint being shown in the left-hand portion of the drawing before the parts are applied against one another and in the right-hand portion with the parts in contact with partial crushing of the joint.

FIGS. 2, 3 and 4 variants of the flexible annular joint in question.

FIG. 5 a diagrammatic cross-sectional view of an annular joint according to the invention fitted into a groove between two bearing surfaces and provided with its sealing control device.

FIG. 6 a partial plan view of part of the joint of FIG. 5, one of the bearing surfaces being removed.

DETAILED DESCRIPTION OF THE PREFERRED EMBODIMENTS

In the embodiment shown in the sectional view of FIG. 1 the annular joint is designated overall by 1 and is to be fitted and provide the sealing between two parts 2 and 3, by being placed within a groove 4 of for example part 3, said groove being open in the direction of part 2. In the drawing the cross-sectional view to the left shows the two parts 2 and 3 spaced from one another, joint 1 mounted in groove 4 not being crushed between these parts. However, in the sectional view to the right parts 2 and 3 are applied against one another and joint 1 is partly crushed between them. Joint 1 is in the form of a double toroidal ring which, in the represented embodiment, is assumed to revolve about the common axis of parts 2 and 3 shown by dot-dash lines in the drawing. Obviously other profiles of the joint could be used, particularly with a joint closed on itself, having rectilinear sides connected by curvilinear portions or the like.

The first metal ring of joint 1 essentially comprises an inner core formed by a helical spring 5 with contiguous turns and preferably of steel, being closed on itself. Spring 5 is surrounded by a first metal envelope 6 made from a slightly ductile metal, for example mild steel, itself surrounded by a second envelope 7 made from a more ductile metal, for example copper or aluminium, which is able to come into contact with the facing surfaces of parts 2 and 3 against which is applied the joint.

According to the invention the inner envelope 6 in which is inserted spring 5 is extended by two planar faces 8 and 9 essentially disposed on either side of an equatorial plane of symmetry of joint 1. Faces 8 and 9 are extended up to a certain distance opposite to spring 5 and terminate by two flared extensions 10 and 11 able to come into contact with a solid ring 12, more particularly made from a suitable elastomer material, for example rubber and constituting the second plastic ring of joint 1. Thus, faces 8 and 9 form between elastomer ring 12 and the metal ring formed by spring 5 and its envelopes 6 and 7 a connecting fitting extending over an appropriate distance. The flared extensions 10 and 11 terminating the planar faces 8 and 9 determine the start of a sector of a circle, whose chord is at the most equal to the diameter of the elastomer ring. The latter can have a diameter equal to or exceeding the diameter of the assembly formed by the spring and its envelopes and can be selected from the very wide range of available materials. In particular ring 12 may be made in one piece or comprise elements connected by any known process, such as vulcanisation, bonding, etc., with no limitation to its nominal diameter.

The two parallel faces 8 and 9 extending envelope 6 can be connected to one another by spots or by other processes, particularly by a continuous welding bead in such a way as to prevent any passage of the atmosphere between these faces.

The composite joint according to the invention thus has the advantage of using without any significant modification the coating of the inner spring to form at the same time a fitting recess for an elastomer ring, whereby by duplicating the metal joint the latter provides a protective shield with respect to the thermal or chemical stresses of the medium against which sealing is effected. Moreover, the parallel faces extending the envelope permit the arrangement of probes suitable for controlling the sealing made between the elastomer ring and the metal joint.

It is obvious that the improvement in question can be used whatever the nature of the recess receiving the composite joint, no matter whether the latter is fitted within a groove as shown in FIG. 1 or in an assembly with planar bearing surfaces where the limitation of crushing can be ensured by an inner metal locking ring 13 (FIG. 2) positioned within the spring 5 or by an external abutment 14 (FIG. 3) mounted externally of the latter.

As a variant the parallel faces 8 and 9 extending in the equatorial plane of the joint need not be directly connected to the metal envelope 6 surrounding spring 5, but can instead be separated from the latter by discontinuities such as 15 and 16. As shown in FIG. 4 these discontinuities are symmetrical to one another with respect to the plane of symmetry in accordance with a centre angle of approximately 270°. This configuration is particularly favourable for the realisation of non-circular joints. Moreover and in the same drawing the elastomer ring 12 is shown with an external tongue 17 located in the equatorial plane of the joint, said tongue permitting a better centring in the case of assemblies with planar bearing surfaces and in this way provides an additional mechanical protection for the elastomer joint.

FIG. 5 shows the metal part of the composite joint 1 comprising an inner core formed by a helical spring 5 with contiguous turns, preferably made from steel and closed on itself. Spring 5 is surrounded by a first metal envelope 6 made from slightly ductile metal, for example mild steel, itself surrounded by a second envelope 7, made from a more ductile metal, for example copper or aluminium, able to come into contact with the facing surfaces of the two parts 2 and 3 against which is applied joint 1. Parts 2 and 3 define between them a groove 4 ensuring the housing of the joint.

The inner envelope 6 in which is embedded the spring 5 is extended by two planar faces 8 and 9 disposed substantially on either side of an equatorial plane of symmetry of joint 1. These faces 8 and 9 extend up to a certain distance opposite spring 5 and terminate by two flared extensions 10 and 11 in contact with a solid ring 12, made more particularly from an appropriate elastomer material, for example rubber.

According to the invention the composite joint 1 is arranged with the direct attachment thereto of a means permitting the permanent control of the atmosphere within groove 4, more particularly between the bearing zones of the outer envelope 7 and elastomer ring 12 against faces 2 and 3. To this end a capillary tube 18 is associated with ring 12 and is mounted so as to traverse the ring approximately diametrically by an opening 19 therein and whose diameter is significantly smaller than that of tube 18, in such a way that the latter can be forcibly engaged through ring 12, the elastic material of the latter providing a satisfactory sealing at the passage of the tube. Tube 18 is extended beyond ring 18 and in the present embodiment traverses the flared extension 10 extending the upper planar face 8 of envelope 6, tube 18 being fixed with respect to the joint in advantageous manner by a welding spot 20. End 21 of tube 18 extends slightly beyond the welding spot in such a way that opening 22 provided at the end and on the sides of the tube is positioned within an opening 23 made in the planar face 8. Tube 18 is able to permanently sample a fraction of the atmosphere in groove 4 between ring 12 and envelope 7 when surfaces 2 and 3 have been applied against one another. At its opposite end beyond elastomer ring 14 capillary tube 18 is joined to a coupling 24 permitting the connection of the tube to a detector (not shown) able to control the sealing realised by the joint.

The metalloplastic flexible annular joint according to the invention thus has a detection system of its own and which makes it possible to permanently control the sealing obtained, said control taking place externally of the joint in ambient atmosphere and using an appropriate apparatus connected to the free end of the capillary tube. This very interesting arrangement makes it possible to obtain a double sealing and in particular to realise, between the metal ring and the plastic ring of the joint, an enclosure of reduced volume in which it is possible to carry out a sealing test without it being necessary to produce a vacuum internally or externally of the pipe on which the joint is mounted.

The invention is not limited to the embodiments described and represented hereinbefore and various modifications can be made thereto without passing beyond the scope of the invention.

What is claimed is:

1. A metalloplastic flexible annular joint, wherein it comprises a first metal ring constituted by an inner metal spring with contiguous turns closed on itself and surrounding said spring, at least one metal envelope in which is embedded the spring, said envelope being extended by two parallel planar faces which extend in a transverse equatorial plane of symmetry of the joint, said faces having flared extensions moving away from said plane at a predetermined distance from the spring to partly surround a second solid elastomer plastic ring which is coaxial to the spring in such a way as to create between the two rings a sealed enclosure of limited volume which can be used for controlling the sealing of the joint.

2. A joint according to claim 1, wherein the envelope surrounding the inner spring is directly connected to two parallel planar faces.

3. A joint according to claim 1, wherein the envelope surrounding the inner spring has discontinuities at the connection with the planar faces.

4. A joint according to claim 1, wherein the inner spring is associated with an inner metal locking ring or an outer abutment limiting the crushing thereof.

5. A flexible annular joint according to claim 1, wherein the joint has at least one transverse capillary tube traversing the second elastomer plastic ring and a flared extension of one of the planar faces extending the envelope surrounding the inner spring of the first metal ring, said capillary tube issuing into an opening made in the said face and communicating with the tight enclosure for controlling the sealing of the joint.

6. A joint according to claim 5, wherein the capillary tube substantially diametrically traverses the second elastomer ring by an opening whose diameter is slightly smaller than that of the tube.

7. A joint according to claim 5, wherein the capillary tube is fixed to the flared extension which traverses by means of a welding spot.

8. A joint according to claim 5, wherein the capillary tube is connected at its opposite end, externally of the joint, to a control and/or measuring apparatus.

* * * * *